United States Patent
Nangia

(10) Patent No.: US 9,319,517 B2
(45) Date of Patent: Apr. 19, 2016

(54) SYSTEM AND METHOD FOR PROVIDING SERVICES IN COMMUNICATION NETWORK

(76) Inventor: Rajender Kumar Nangia, New Delhi (IN)

(*) Notice: Subject to any disclaimer, the term of this patent is extended or adjusted under 35 U.S.C. 154(b) by 0 days.

(21) Appl. No.: 14/233,743

(22) PCT Filed: Jul. 16, 2012

(86) PCT No.: PCT/IN2012/000499
§ 371 (c)(1),
(2), (4) Date: Apr. 4, 2014

(87) PCT Pub. No.: WO2013/011524
PCT Pub. Date: Jan. 24, 2013

(65) Prior Publication Data
US 2015/0163355 A1    Jun. 11, 2015

(30) Foreign Application Priority Data

Jul. 18, 2011  (IN) .......................... 2016/DEL/2011
May 1, 2012    (IN) .......................... 1331/DEL/2012

(51) Int. Cl.
H04M 3/42    (2006.01)
H04M 3/51    (2006.01)
H04M 3/54    (2006.01)
H04M 3/493   (2006.01)

(52) U.S. Cl.
CPC ........ H04M 3/42059 (2013.01); H04M 3/5166 (2013.01); H04M 3/54 (2013.01); *H04M 3/493* (2013.01)

(58) Field of Classification Search
CPC .............. H04M 2201/12; H04M 2201/36; H04M 2203/2044; H04M 2203/2072; H04M 15/68; H04N 21/25816; H04N 21/25843; H04N 21/25875; H04N 21/25891; H04N 21/26283; H04L 67/26; H04L 12/1403; H04L 12/1425; G06Q 30/02; G06Q 20/16
USPC ............ 379/142.01, 142.04, 142.05, 142.06, 379/142.17, 211.01, 248, 201.01, 201.02, 379/201.05, 201.08, 201.12, 207.14
See application file for complete search history.

(56) References Cited

U.S. PATENT DOCUMENTS

| | | | | |
|---|---|---|---|---|
| 7,133,753 B2* | 11/2006 | Nakajima | .......... | G01C 21/3629 340/995.1 |
| 2002/0069244 A1* | 6/2002 | Blair | ....................... | G06Q 20/02 709/203 |
| 2004/0162671 A1* | 8/2004 | Nakajima | .......... | G01C 21/3629 701/428 |
| 2004/0167680 A1* | 8/2004 | Nakajima et al. | .................. | 701/1 |
| 2005/0071253 A1* | 3/2005 | Yang | ............................... | 705/27 |

(Continued)

*Primary Examiner* — Binh Tieu

(57) ABSTRACT

A system and method for providing content or information over a communication network having communication service providers. The system includes a call handler having a call landing module configured to receive an incoming call from a calling device, wherein the incoming call is generated by dialing a predetermined service number on the calling device. Further, the call handler includes a call action module configured to capture a Calling Line Identity (CLI) of the calling device and capture the predetermined service number, and is configured to perform an action on the incoming call. Also, the system includes a look up module and a forwarding module configured to scan a database having information or content corresponding to a plurality of service numbers, retrieve information or content corresponding to the predetermined service number from the database, and forward the information or content to the calling device.

20 Claims, 10 Drawing Sheets

(56) References Cited

U.S. PATENT DOCUMENTS

| | | | | |
|---|---|---|---|---|
| 2007/0047523 A1* | 3/2007 | Jiang | ............... | H04M 3/02 370/352 |
| 2007/0220553 A1* | 9/2007 | Branam | ............... | G06Q 30/02 725/46 |
| 2007/0281669 A1* | 12/2007 | Jiang | ............... | H04M 3/44 455/414.1 |
| 2013/0003955 A1* | 1/2013 | Swamy et al. | ............... | 379/201.01 |
| 2013/0183930 A1* | 7/2013 | Rao | ............... | H04N 21/2543 455/406 |

* cited by examiner

SYSTEM AND METHOD FOR PROVIDING SERVICES IN COMMUNICATION NETWORK

FIELD OF THE DISCLOSURE

The present invention generally relates to a system and method for providing services in a communication network, and particularly, relates to a system and method for providing content, interactive services and value added services in a telephonic network.

BACKGROUND OF THE DISCLOSURE

Content based services are becoming more and more popular among telecom operators and telephone users. These days many telecom operators provide multiple content based services. In these content based services, telecom operators provide usually information, such as match score, weather updates, horoscope, and other similar information, to the customers through text messages, voice messages, multimedia messages, and the like. However, it should be noted that in providing such content based services, a typical service charge is deducted from the account of the telephone users on requesting for such content.

Further, along with the increase in popularity of content based services, there has been a corresponding increase in user interactivity over telephony networks. Nowadays, plurality of Television shows tie up with telecom operators in providing users with interactive content over the telephony network. Not only do these companies provide users interactive content, they also encourage users to participate in various kinds of quizzes, games, voting, and other similar campaigns through their telephonic devices. However, again it should be noted that a typical service charge is deducted from the account of the user on requesting such interactive services.

In addition to the increase in popularity of content based services and user interactivity, there has also been an increase in providing various other value added services over telephony networks. Since telephones, and particularly wireless devices, such as mobile phones, have far reaching penetration in many countries, including countries, such as India and China, using telephony networks to provide almost all kind of services to customers is considered to be the next revolution in telephony communication. Presently, many companies are offering such value add services to customers, however, again a typical service charge is deducted from the account of customers to avail such services.

Therefore, there is an imperative need to develop a system and method for providing services in a communication network, wherein the users avail the aforementioned services almost free of cost.

WIPO publication number 2008128053 ('053 publication) discloses a system and method for utilizing information exchanged during an initiation phase (i.e., the 'ringing' phase) of a conventional telephone connection request received from a calling device, in order to identify and provide a user with content or enhanced services. The '053 publication therefore endeavors to provide TOLL FREE services to the users.

Moreover, some companies have started offering such value added services through telephony networks using caller ID capture. It will be apparent to a person skilled in the art that 'miss calls' provide an effective means of communications in many countries, including India. The term 'miss calls' as defined herein refers to call in a communication network, which have failed to complete, probably because of an intentional disconnection by the dialer. Since the miss calls do not incur any charges on the dialers, the users may be able to avail such services based on miss calls free of cost. However, there is a limitation in such services.

Though these solutions provide TOLL FREE services to the users, they do not take care of the financial interest of the telecom operators, who are important stake holders in such communication network. More often than not, such telecom operators do not gain any monetary incentive in such value added services. Therefore, there interest in hosting such services on their network is very limited.

Therefore, there is a need to develop a system and method for providing services in a communication network that incurs minimum or almost zero financial tolls on the customers. Further, there is a need to develop a system and method for providing services in a communication network, which provide considerable revenues to the service operators, and thereby takes their concerns into consideration. There is further need to develop a system and method that is adapted to provide modern day interactive services, content and value added services to the customers. There is also a need to develop a system and method for providing various services in a communication network that is secure and reliable.

OBJECTS OF THE DISCLOSURE

In view of the foregoing disadvantages inherent in the prior art, the general objective of the present invention is to provide a system and method for providing various services in a communication network using a TOLL FREE platform.

It is an object of the invention to provide a system and method for providing services in a communication network, wherein the system and method incurs minimum or almost zero financial tolls on the customers.

It is another object of the invention to provide a system and method, which provide considerable revenues to the service operators, and thereby takes their concerns into consideration.

It is another object of the invention to provide a system and method, which is capable of providing modern day interactive services, such as gaming, shopping, quizzes, voting and the like, to the customers.

It is another object of the invention to provide a system and method, which is capable of providing modern day content based services, such as status tracking, score updates, and other similar services, to the customers.

It is another object of the invention to provide a system and method, which is capable of providing value added services, such as reservations, location finding services, emergency services, and other similar services, to the customers.

It is another object of the present invention to provide a system and method for providing various services to users in a communication network in a safe, reliable and secure manner.

It is another object of the present invention to provide a system and method for generating customer leads in a communication network, wherein the leads are generated without incurring any cost on the customers.

It is another object of the present invention to provide a system and method for providing customized services to customers.

SUMMARY OF THE DISCLOSURE

In light of the above objects, a system and method for providing a system for providing content or information over a communication network having one or more communication service providers is disclosed.

The present invention provides a system for providing content or information over a communication network having one or more communication service providers. The system includes a call handler having a call landing module configured to receive an incoming call from a calling device capable of being operated by a user. The incoming call is generated by dialing a predetermined service number on the calling device. Further, the call handler includes a call action module operatively coupled to the call landing module. The call action module is configured to capture a Calling Line Identity (CLI) of the calling device and capture the predetermined service number dialed from the calling device. Further, the call action module is configured to perform an action on the incoming call that enables service providers to derive monetary benefit while providing content or information over the communication network. The system further includes a look up module communicably coupled to the call handler, wherein the look up module is configured to scan a database having information or content corresponding to a plurality of service numbers, and retrieve information or content corresponding to the predetermined service number from the database. The system further includes a forwarding module communicably coupled to the look up module. The forwarding module is configured to forward the information or content to the calling device, wherein the calling device receives the information or content, and wherein the system ensures that the service providers get monetary benefit while providing content or information to the calling device over the communication network.

In another aspect, the present invention provides a system for performing a task using a communication network having one or more communication service providers. The system includes a call handler having a call landing module configured to receive an incoming call from a calling device capable of being operated by a user. The incoming call is generated by dialing a predetermined service number on the calling device. Further, the call handler includes a call action module operatively coupled to the call landing module. The call action module is configured to capture a Calling Line Identity (CLI) of the calling device and capture the predetermined service number dialed on the calling device. Further, the call action module is configured to perform an action on the incoming call that enables service providers to derive monetary benefit while providing content or information over the communication network. The system includes a look up module communicably coupled to the call handler. In one embodiment, the look up module is configured to scan a database having a list of tasks corresponding to a plurality of service numbers, and retrieve a task corresponding to the predetermined service number from the database. The system also includes a forwarding module configured to perform the task, wherein the system ensures that the service providers get monetary benefit while the task is performed.

In yet another aspect, the present invention provides a system for providing content or information over a communication network having one or more communication service providers. The system includes a call handler having a call landing module configured to receive an incoming call from a calling device capable of being operated by a user. The incoming call is generated by dialing a predetermined service number on the calling device. Further, the call handler includes a call action module operatively coupled to the call landing module. The call action module is configured to capture a Calling Line Identity (CLI) of the calling device and the predetermined service number dialed on the calling device, and to perform an action on the incoming call. The system further includes a safety module communicably coupled to the call action module. The safety module is configured to capture an International Mobile Equipment Identity (IEMI) number of the calling device and verify the calling device based on the captured IEMI number. The system includes a look up module communicably coupled to the call handler. The look up module is configured to scan a database having information or content corresponding to a plurality of service numbers, and retrieve information or content corresponding to the predetermined service number from the database. The system further includes a forwarding module configured to forward the information or content to the calling device, wherein the calling device of the calling device receives the information or content.

In yet another aspect, the present invention provides a system for providing content or information over a communication network having one or more communication service providers. The system includes a call handler having a call landing module configured to receive an incoming call from a calling device capable of being operated by a user. The incoming call is generated by dialing a predetermined service number on the calling device. The call handler includes a call action module operatively coupled to the call landing module, wherein the call action module is configured to capture a Calling Line Identity (CLI) of the calling device and capture the predetermined service number dialed on the calling device, and perform an action on the incoming call. The system includes a look up module communicably coupled to the call handler. The look up module is configured to scan a database having information or content corresponding to a plurality of service numbers, and retrieve information or content corresponding to the predetermined service number from the database. The system further includes a forwarding module communicably coupled to the look up module. The forwarding module is configured to forward the information or content to the calling device, wherein the calling device of the calling device receives the information or content. In one embodiment, the system further includes a customization module communicably coupled to the look up module, wherein the customization module is configured to customize information or content to be forwarded to the calling device based on a captured IEMI number of the calling device.

In another aspect, the present invention provides a method for providing content or information over a communication network having a plurality of communication service providers. The method includes receiving an incoming call from a calling device capable of being operated by a user, wherein the incoming call is generated by dialing a predetermined service number on the calling device. Further, the method includes capturing a Calling Line Identity (CLI) of the calling device, and performing an action on the incoming call that enables service providers to derive monetary benefit while providing content or information over the communication network. The method also includes retrieving the information or content corresponding to the predetermined service number from a database, and forwarding the information or content to the calling device. The calling device receives the information or content, and the method ensures that the service providers get monetary benefit while providing content or information to the calling device over the communication network.

In yet another aspect, the present invention provides a method for performing a task using a communication network having a plurality of communication service providers. The method includes receiving an incoming call from a calling device capable of being operated by a user. The incoming call is generated by dialing a predetermined service number on the calling device. The method includes capturing a Calling Line Identity (CLI) of the calling device, performing an action on the incoming call that enables service providers to derive monetary benefit while providing content or information over the communication network, retrieving a task corresponding to the predetermined service number from the database, and performing the task. The method ensures that the service providers get monetary benefit while the task is being performed.

In yet another aspect, the present invention provides a method for providing content or information over a communication network having a plurality of communication service providers. The method includes receiving an incoming call from a calling device capable of being operated by a user. The incoming call, is generated by dialing a predetermined service number on the calling device. Further, the method includes capturing a Calling Line Identity (CLI) of the calling device and performing an action on the incoming call. The method also includes capturing an International Mobile Equipment Identity (IEMI) number of the calling device and verifying the user based on the captured IEMI number. The method further includes retrieving the information or content corresponding to the predetermined service number from a database, and forwarding the information or content to the calling device.

In yet another aspect, the present invention provides a method for providing content or information over a communication network having a plurality of communication service providers. The method includes receiving an incoming call from a calling device capable of being operated by a user. The incoming call is generated by dialing a predetermined service number on the calling device. Further, the method includes capturing a Calling Line Identity (CLI) of the calling device, performing an action on the incoming call, and retrieving the information or content corresponding to the predetermined service number from a database. The method further includes forwarding the information or content to the calling device, and customizing information or content to be forwarded to the user based on a captured IEMI number of the calling device.

This together with the other aspects of the present invention along with the various features of novelty that characterized the present disclosure is pointed out with particularity in claims annexed hereto and forms a part of the present invention. For better understanding of the present disclosure, its operating advantages, and the specified object attained by its uses, reference should be made to the accompanying descriptive matter in which there are illustrated exemplary embodiments of the present invention.

BRIEF DESCRIPTION OF THE DISCLOSURE

The advantages and features of the present invention will become better understood with reference to the following detailed description and claims taken in conjunction with the accompanying drawings, in which:

Like numerals represent like components throughout the description section.

DETAILED DESCRIPTION OF THE DISCLOSURE

Figure 1:
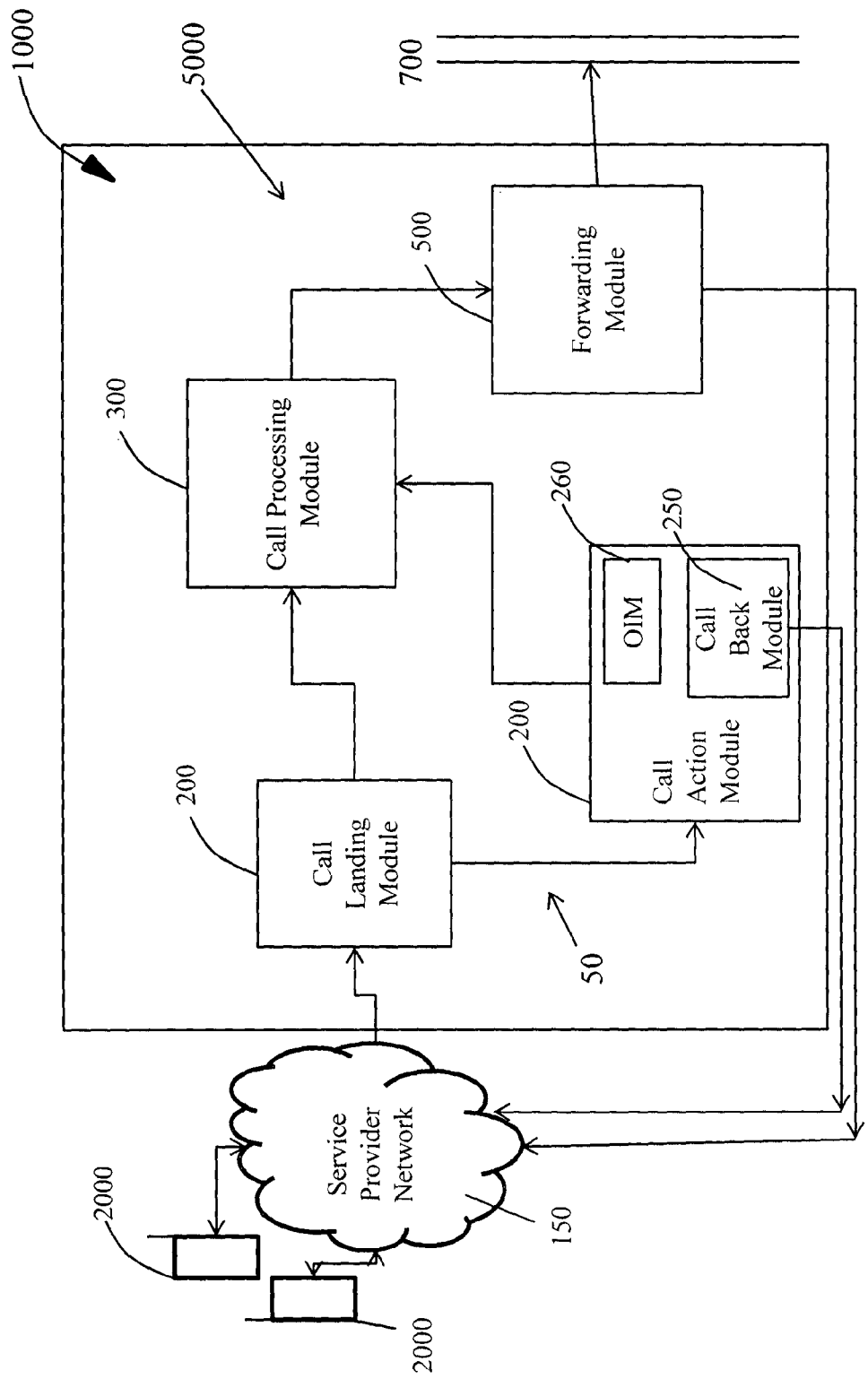
FIG. 1 illustrates a system for providing services in a communication network, according to various embodiments of the present disclosure.

For a thorough understanding of the present disclosure, reference is to be made to the following detailed description, including the appended claims. Although the present disclosure is described in connection with exemplary embodiments, the present invention is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present invention. Also, it is to be understood that the phraseology and terminology used herein is for the purpose of description and should not be regarded as limiting.

The terms "a" and "an" herein do not denote a limitation of quantity, but rather denote the presence of at least one of the referenced item.

The term "having", "including" and "comprising" herein refer to inclusion of at least one of the referenced items.

The present invention provides a system and method for providing content or information to various users in a communication network. Further, the present invention provides a system and method capable of performing a task using various communication means in a communication network. The term "content" as mentioned herein may refer to any type of text or data. The term "information" as mentioned herein refers to any kind of useful message that is required to be delivered to the users. Suitable examples of content or information include, but are not limited to, updates, status updates, tracking updates, score updates, news, location information, weather information, bank account information, credit card information, and the like. Suitable examples of the tasks include, but are not limited to, providing value added services including reservations, bookings, information reporting service, bank transactions, route guidance, interactive services including quizzes, shopping, games, voting, and the like. Also, it should be noted that the term 'communication network' as mentioned herein refers to any network for communicating between two parties. The communication network may be wired or wireless, and may preferably include a telephone network, a cellular network, whether GSM or CDMA, and the like. However, it should be clearly understood that the aforementioned examples of the content or information are exemplary and should not be construed as a limitation to the present invention. Basically, the present invention provides a system and method for effectively delivering various content, information, services and performing various tasks for a user in the communication network, wherein the user may be able to signify its intention about the kind of content, information, services and performing various tasks by giving "miss calls" to the system of the present invention. It will be apparent to a person skilled in the art that the term "miss calls" as mentioned herein refers to telephone calls that are not answered by their intended recipients prior to the termination of ringing on the recipients' end by either the dialers or the recipients. These miss calls are becoming very important and interesting means of communication, especially in regions of South East Asia and the like. The present system and method utilizes these miss calls to deliver content or information or services or perform various tasks for the user giving such miss calls to the system. Therefore, in an embodiment of the present invention, the present invention provides a system for providing content or information over a communication network having one or more communication service providers. The term "communication service providers" as mentioned herein refers to telecom operators, who provide the infrastructure and the like, for allowing communication between various parties. The system of the present invention includes a call handler, which has a call landing module configured to receive an incoming call (communication request or voice communication request) from a calling device capable of being operated by a user, wherein the incoming call is generated by dialing a predetermined service number on the calling device. Further, the call handler has a call action module operatively coupled to the call landing module, wherein the call action module is configured to capture a Calling Line Identity (CLI) of the calling device and capture the predetermined service number dialed from the calling device, and perform an action on the incoming call that enables service providers to derive monetary benefit while providing content or information over the communication network. The system also includes a look up module communicably coupled to the call handler, wherein the look up module is configured to scan a database having information or content corresponding to a plurality of service numbers, and retrieve information or content corresponding to the predetermined service number from the database. The system also has a forwarding module communicably coupled to the look up module, wherein the forwarding module is configured to forward the information or content to the calling device. The information or content sent by the forwarding module is received by the calling device, and in such a system the service providers get monetary benefit while providing content or information to the calling device over the communication network. The system and method of the present invention will be better understood by accompanying drawings, namely FIGS. 1-10.

Figure 2:
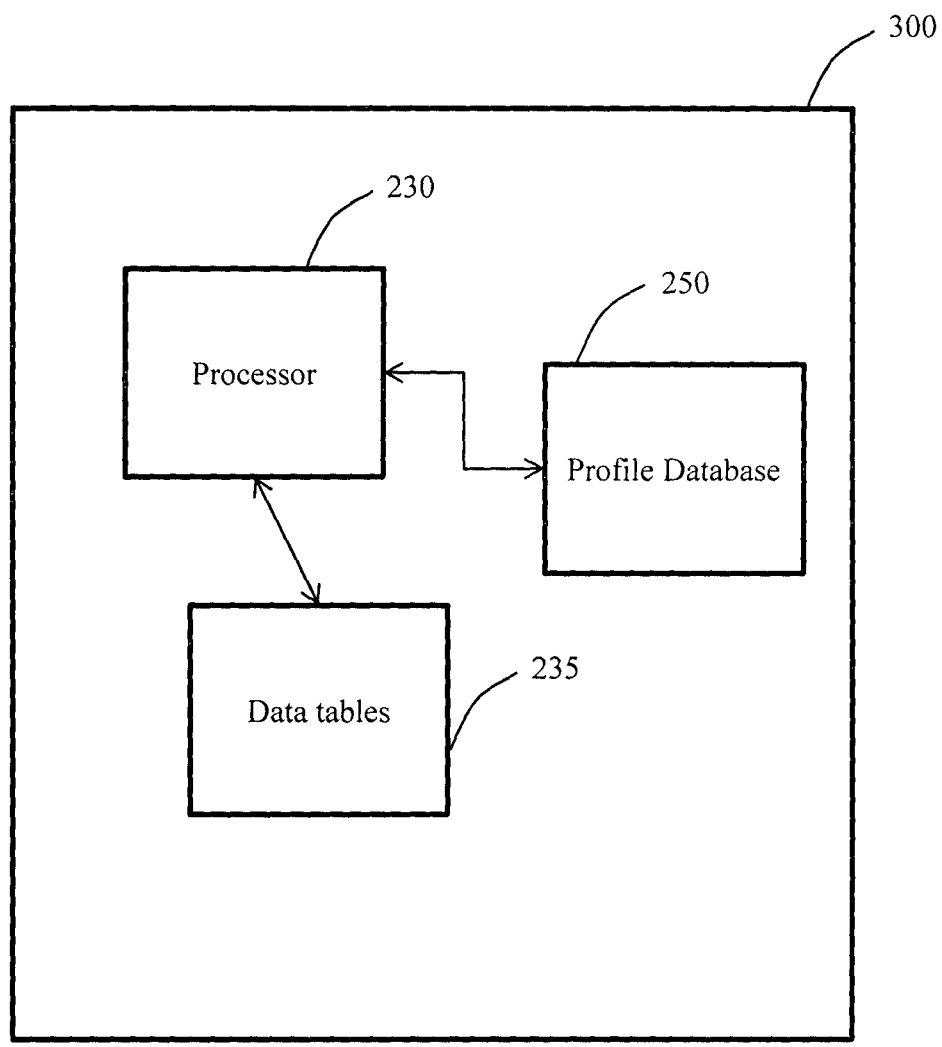
FIG. 2 illustrates a call processing module of each of the systems of FIGS. 1 and 2, according to various embodiments of the present disclosure.
Figure 3:
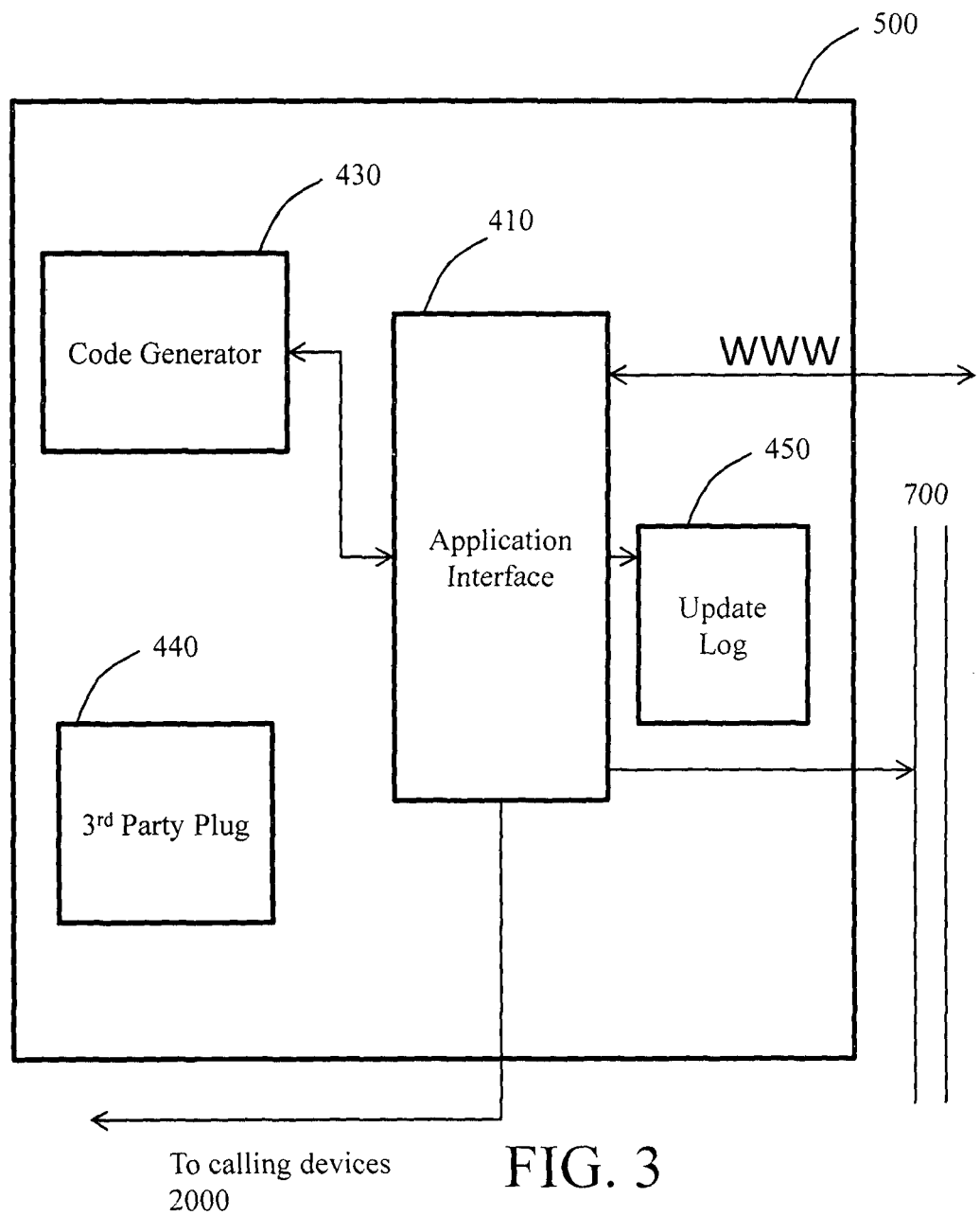
FIG. 3 illustrates a master messaging module of each of the systems of FIGS. 1 and 2, according to various embodiments of the present disclosure.

The system of the present invention will now be described as system 1000 with reference to FIGS. 1-3. The system 1000 is configured to deliver content or information over a communication network 5000. It will be apparent to a person skilled in the art that the system 1000 may operate as a stand-alone system, or may operate integral to a telecom operator system. In one embodiment, the system 1000 may operate as a stand-alone system in operational communication with one or more communication service providers 150 (only one service operator 150 is shown).

As depicted in FIG. 1, the system 1000 includes a call handler 50, which includes a call landing module 100. In one embodiment, the call landing module 100 is configured to receive an incoming call from at least one of one more calling devices 2000 capable of being operated by a user (not shown). In one embodiment, the calling devices 2000 are similar to known in the art calling devices, such as mobile phones, PDAs and the like. In various embodiments of the present invention, the calling device is at least one of a mobile phone, a wired phone, and a Personal Digital Assistant (PDA). However, the aforementioned examples of the calling devices 2000 should not be construed as a limitation to the present disclosure. Accordingly, the calling devices 2000 are any devices that are able to set up a voice or text based communication. In one embodiment of the present invention, the calling devices 2000 are mobile phones 2000.

In one embodiment, the term 'incoming call' as mentioned herein may refer to "phone call requests" originating from the calling devices 2000, wherein the incoming call is generated by dialing a predetermined service number on the calling device 2000. More specifically, the "phone call requests" may refer to voice call requests dialed by the user of the calling devices 2000. In one embodiment, the phone call requests may be incomplete phone call requests, i.e., phone call requests terminated by the user before an action is taken by the system 1000. Such phone call requests are commonly referred to as 'miss calls'. The phone call may be made to a particular unique number (predetermined service number), which is generated by the system 1000 or is a pre-generated number assigned by service providers 150. In one embodiment, the predetermined service number is at least one of a numeric number, and an alphanumeric number.

In another embodiment, the term "incoming call" may refer to a message, such as a text message or a multimedia message including voice message, sent from the calling devices 2000 by the user. Accordingly, the users may send incoming call requests or text messages or multimedia messages to the system 1000. However, such sending of the incoming call should not be construed as a limitation to the present invention.

In one embodiment, the incoming call may include an embedded caller ID or Calling Line Identity (CLI) of the calling device 2000 from which the incoming call originates. The term 'caller ID' or Calling Line Identity (CLI) as mentioned herein refers to the number of dialing party in a telephone network. It will be apparent to a person skilled in the art that the number may be a ten digit number and may correspond to the unique SIM number that the calling device 2000 may be employing. In an embodiment of the present invention, the incoming call may additionally include the predetermined service number (hereinafter referred to as "master number"). The master number may reflect the type of information or content or service or task the users of the calling device 2000 wants the system 1000 to provide or perform. More specifically, the master number may reflect the type of information or content or service or task the users of the calling device 2000 wants the system 1000 to provide to them.

In one embodiment, the master number sequence may be a sequence of numbers. In another embodiment, the master number sequence may be a sequence of alphabets. In another embodiment, the master number sequence may be an alphanumeric sequence. In an embodiment of the present invention, the call landing module 100 may be configured to receive the initiation requests from a call forwarding system (not shown).

The call forwarding system may be coupled to the calling devices 2000 and the system 1000. Any initiation requests, such as incoming call requests, originating from the calling devices 2000 may be received by the call forwarding system, which may then forward the incoming call to the call landing module 100. In one embodiment, the call forwarding system may only forward selected incoming calls to the call landing module 100 based on a pre-screening of the incoming calls. In this way, the system 1000 is capable of filtering few incoming call requests, if needed.

As shown in FIG. 1, the call handler 50 further includes a call action module 200 in direct communication with the call landing module 100. The call action module 200 is configured to capture a Calling Line Identity (CLI) of the calling device 200 and capture the predetermined service number dialed from the calling device 200, and perform an action on the incoming call that enables service providers to derive monetary benefit while providing content or information over the communication network 5000.

The incoming calls received by the call landing module 100 are forwarded to the call action module 200. In one embodiment, the call action module 200 may be configured to reject the incoming call requests received by it from the call, landing module 100 after capturing the Calling Line Identity (CLI). In this manner, the system 1000 incurs no charge on the user, and provides various content or information or services or performs tasks TOLL FREE for the user.

In another embodiment, the call action module 200 may be configured to accept the incoming call requests received by it from the call landing module 100 after capturing the Calling Line Identity (CLI), and immediately reject the accepted call. The acceptance of the incoming call ensures that the service providers 150 get monetary benefit while providing content or information to the calling device 200 over the communication network 5000.

In another embodiment, the call action module 200 is adapted to reject the incoming call, call back the calling device 200 after capturing the Calling Line Identity (CLI), and reject the call back after the calling device 200 accepts the call back. The acceptance of the call back by the calling device 200 ensures that the service providers get monetary benefit while providing content or information to the calling device 200 over the communication network 5000.

Figure 5:
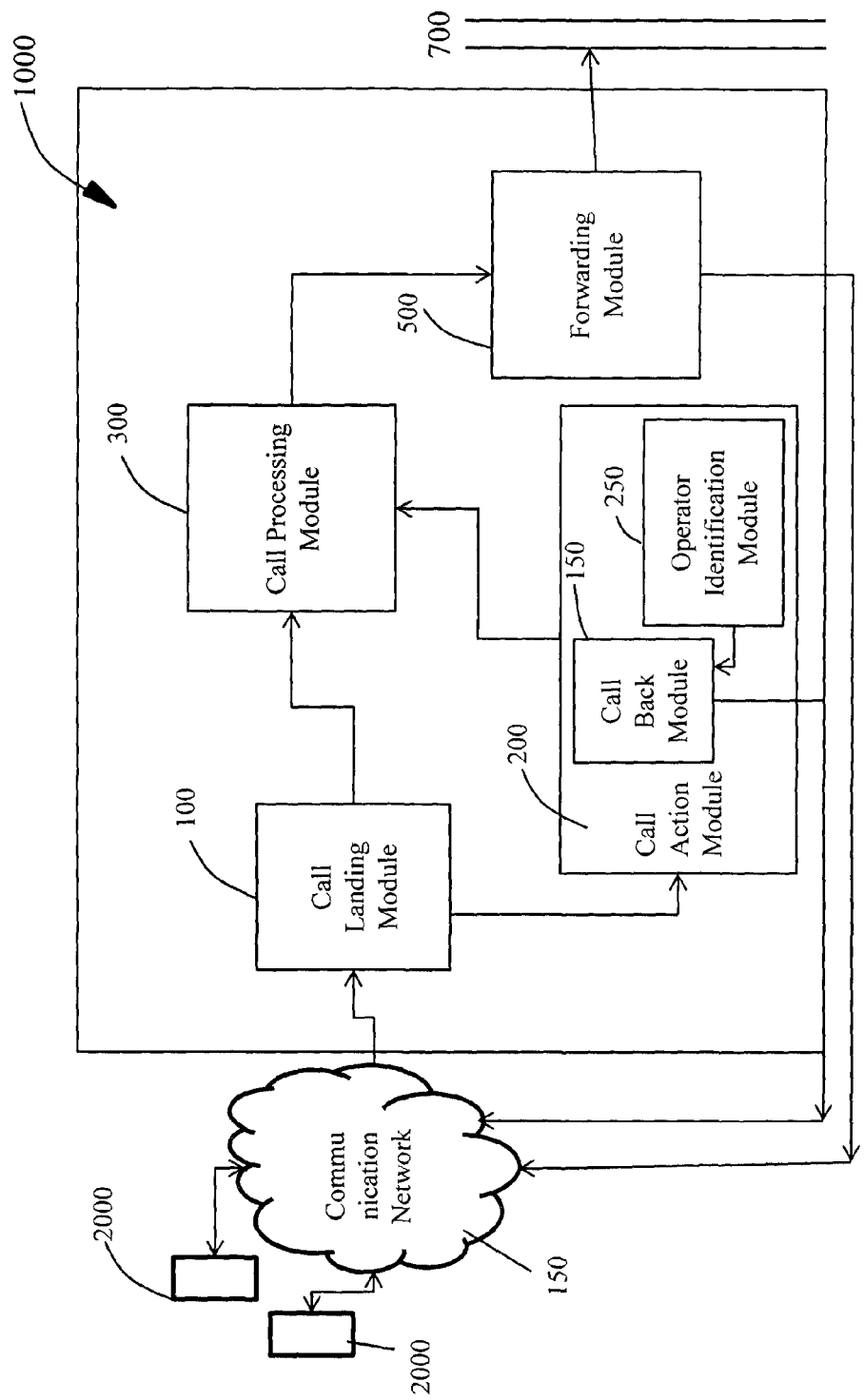
FIG. 5 illustrates an operator identification module in the call action module, according to various embodiments of the present disclosure.

More specifically, the call action module 200 may include a call back module 150 and an operator identification module (OIM) 260. In one embodiment, the OIM 260 tracks the details of the telecom operator of the calling devices 2000. The OIM 260 forwards the details of the telecom operator of the calling devices 2000 to the call back module 150. The OIM 260 compares the telecom operator of the calling devices 2000 with the telecom operators available in the system 1000. Once the comparison is completed the call back module 150 calls back to the calling devices 2000 with the same telecom operator of which the calling devices 2000 using the service. The disconnected call requests are logged by the call back module 150 and the OIM 250, which arranges for a call back by the same telecom operator of which the calling devices 2000 using the service, which then are received by the calling devices 2000. In this way the telecom operator gets some revenue every time a request is made at the system 1000 as shown in FIG. 5.

The system 1000 further includes a look up module 450 communicably coupled to the call handler 50. The look up module 450 includes a call processing module 300 in operational communication with the call landing module 100 and the call action module 200. In one embodiment, the call processing module 300 may be operatively coupled to the call back module 150 of the call action module 200. The call processing module 300 may be configured to process the incoming call requests received by the call landing module 100. Further, the call processing module 300 may be configured to identify the caller IDs of the calling devices 2000. Further, the call processing module 300 may be configured to identify the master number sequences send in the incoming call requests, and identify information, content, one or more services, or tasks that are required to be provided based on the caller IDs and the master number sequences.

In one embodiment, the call processing module 300 includes a processor 230 and a profile database 250 in communication with the processor 230. In one embodiment, the processor 230 may be configured to retrieve the incoming call requests landing on the call landing module 100. In one embodiment, the processor 230 may be configured to retrieve the incoming call requests landing on the call landing module 100.

In another embodiment, the processor 230 may be further configured to decipher the incoming call requests to identify and capture the caller IDs and the master number sequences from the incoming call requests. In one embodiment, the processor 230 may be additionally configured to identify information, content, one or more services, or tasks to be provided based on the identified caller IDs and the master number sequences.

More specifically, the processor 230 may include one or more predefined data tables 235. The data tables 235 may include a list of predefined information, content, one or more services, or tasks associated with the master number sequences. The processor 230 may be configured to compare the identified master number sequences with one or more predefined services, and deduce the information, content, one or more services, or tasks corresponding to the identified master number sequences. In another embodiment, the processor 230 may connect to the profile database 250, and deduce the information, content, one or more services, or tasks accordingly. The profile database 250 may include information pre-fed by the users (according to their caller IDs) of the calling devices 2000. This information may be used by the processor 230 in evaluating the one or more services that the users want. In one embodiment, the personalized profile of the user is pre-stored in the database by the user. The user pre-stores its personalized profile in the database by a registration process.

In another embodiment, the processor 230 may connect to the profile database 250 and the data tables 235 to identify the one or more services that are required to be performed.

The system 1000 may further include a forwarding module 500 in operational communication with the call processing module 300, and more particularly, the processor 230 of the call processing module 300. In one embodiment, the forwarding module 500 may be configured to forward the information or content to the calling device 1000, wherein the calling device 2000 receives the information or content. In one embodiment, the forwarding module 500 is adapted to perform the task as identified by the processor 230.

Accordingly, in one embodiment, the forwarding module 500 may be configured to deliver content to the calling devices 2000. Suitable examples of the content may include score updates, status updates, tracking updates, news information, weather information, and the like. The forwarding module 500 may deliver the content to the calling devices 2000 through an SMS gateway. In one embodiment, the SMS gateway may deliver the content to the calling devices 2000 through the same telecom operator as that of the dialing user.

In one embodiment, the forwarding module 500 may include an application interface 410 configured to deliver the content to the calling devices 2000. In an embodiment, the forwarding module 500 may be configured to provide reservations, bookings, information reporting, route guidance, and the like, to the calling devices 2000. In another embodiment, the forwarding module 500 may be configured to provide various interactive services, such as quizzes, games, shopping, voting, and the like.

In one embodiment, the calling devices 2000 give a call to the system 1000 with its unique number. The incoming call lands on call landing module 100 and call is rejected by call action module 200 or by the calling devices 2000, thereby constituting a miss call. The details of the calling devices 2000 such as name of the user who is operating the calling device 2000, phone number of the user etc. are tracked by the system 1000 and further the said details of the user calling device 2000 is forwarded to third party clients 700, which then deliver the content or information to the calling device 2000. In one embodiment, the system 1000 forwards the details of the calling devices 2000 to only those third party clients 700 that share the same operator as compared to the calling devices 2000.

In one embodiment, the application interface 410 may be in operational communication with information sources, such as WorldWideWeb to provide the content to the calling devices 2000. In another embodiment, the application interface 410 may be in operational communication with private databases for providing various services.

The application interface may include a messaging centre 415, which may be adapted to generate text messages or multimedia messages based on various messaging protocols, such as Short Text Messaging protocol and the like, for delivering the content to the calling devices 2000. The messaging centre 415 may send the messages through the same originating telecom operator or through a different telecom operator. In another embodiment, the forwarding module 500 may be configured to deliver content to third party clients 700, as shown in FIGS. 1 and 3. The term 'third party clients' as mentioned herein refers to persons authorized to access the content being forwarded to the one or more users (to their calling devices 2000).

In addition, the forwarding module 500 may include an update log 450, and a code generator 430 and a third party plug 440. In one embodiment, the code generator 430 may be configured to generate one or more codes which may be sent to the users from time to time. In one embodiment, the update log 450 may be configured to update the status of the one or more services provided by the master module 500. In one embodiment, the third party plug 440 may be configured to trigger the sending of information to the third party clients 700.

In one embodiment, the system 1000 includes a tracking module in communication with the forwarding module 500. The tracking module is configured to keep a track of financial charges payable to the service providers. 150 for providing content or information over the communication network 5000.

Figure 6:
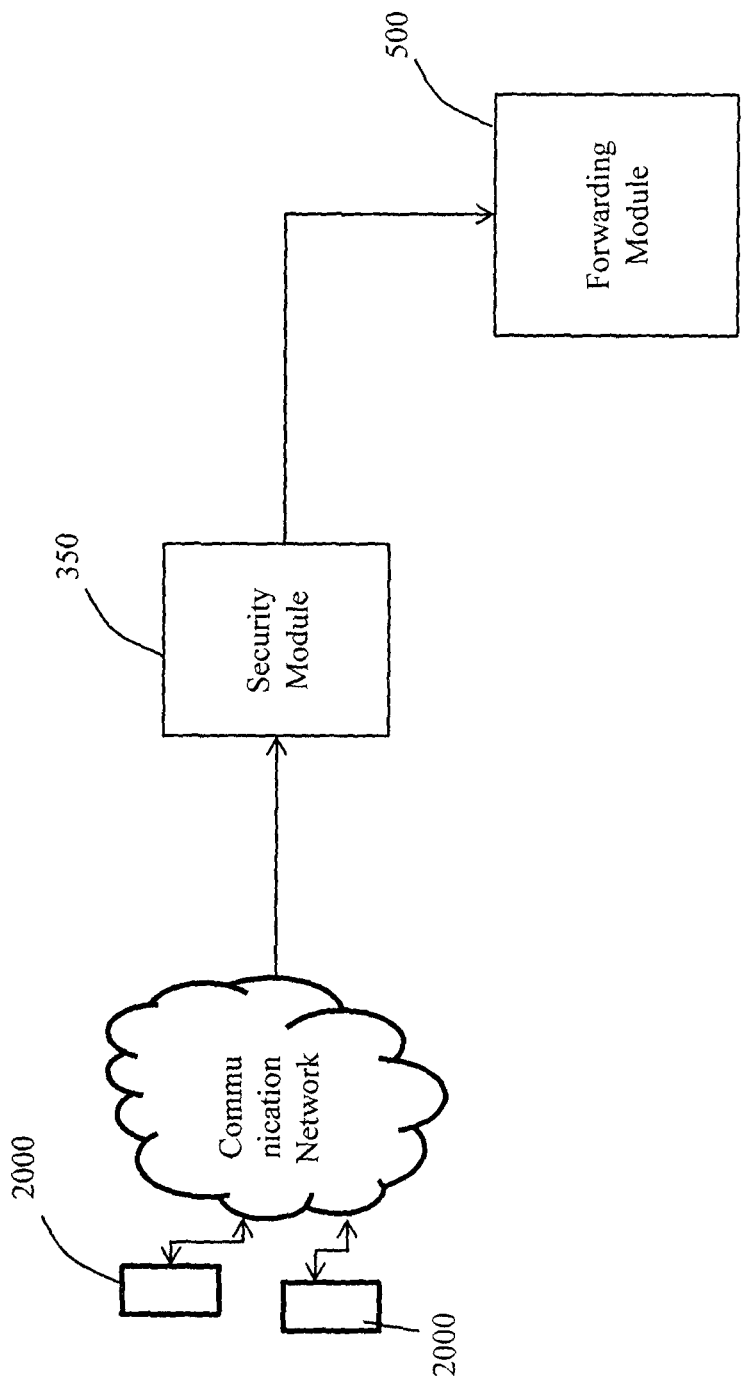
FIG. 6 illustrates a security module implemented in the system, according to various embodiments of the present disclosure.
Figure 7:
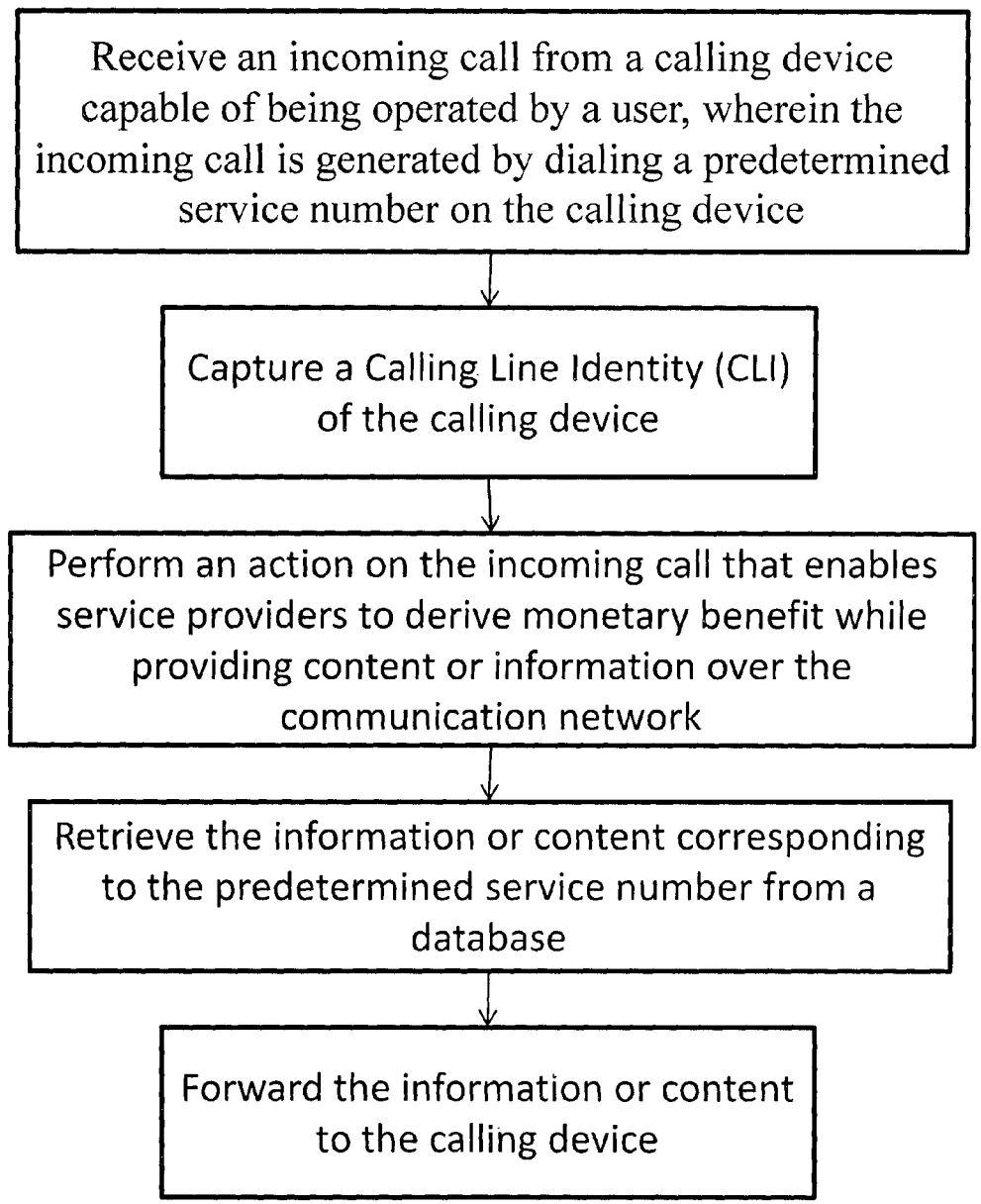
Figure 8:
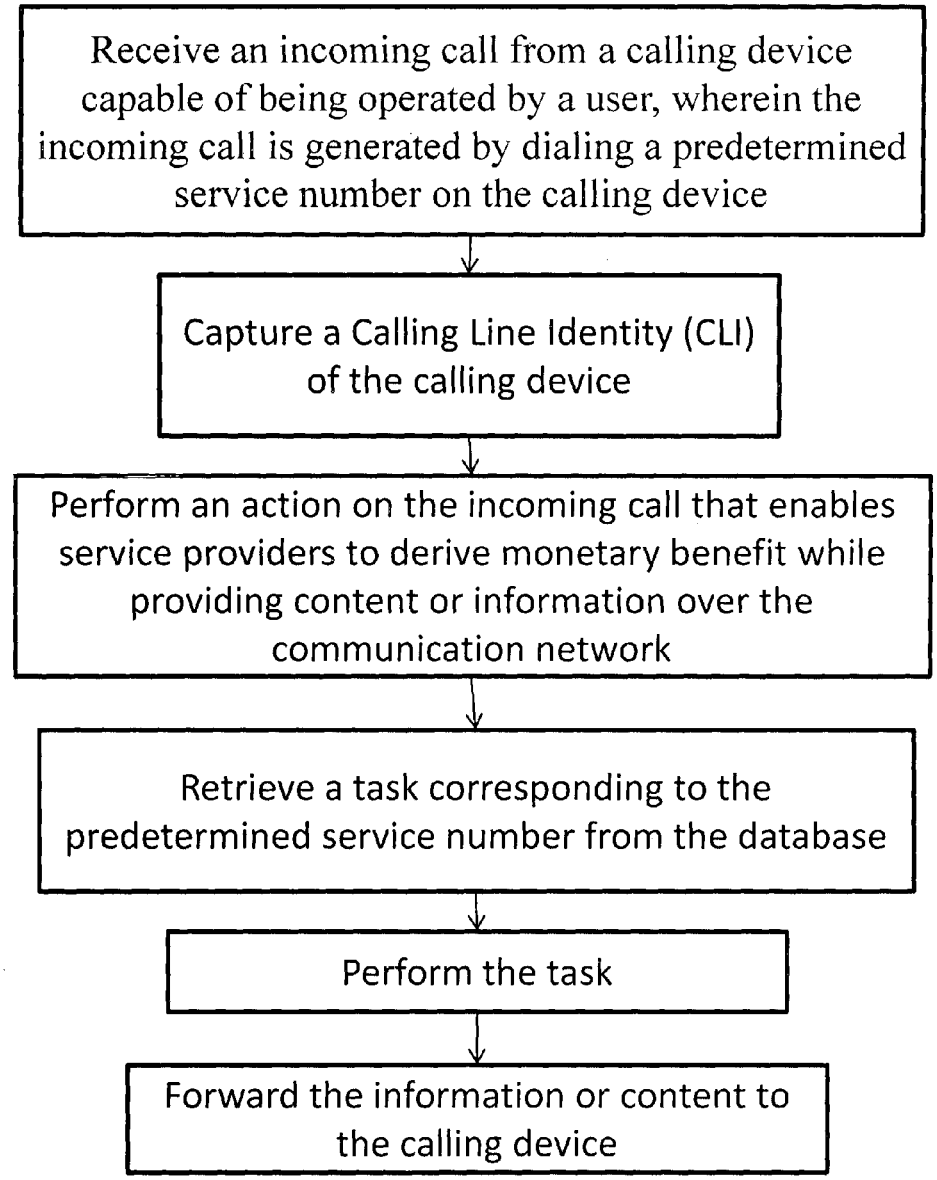
Figure 9:
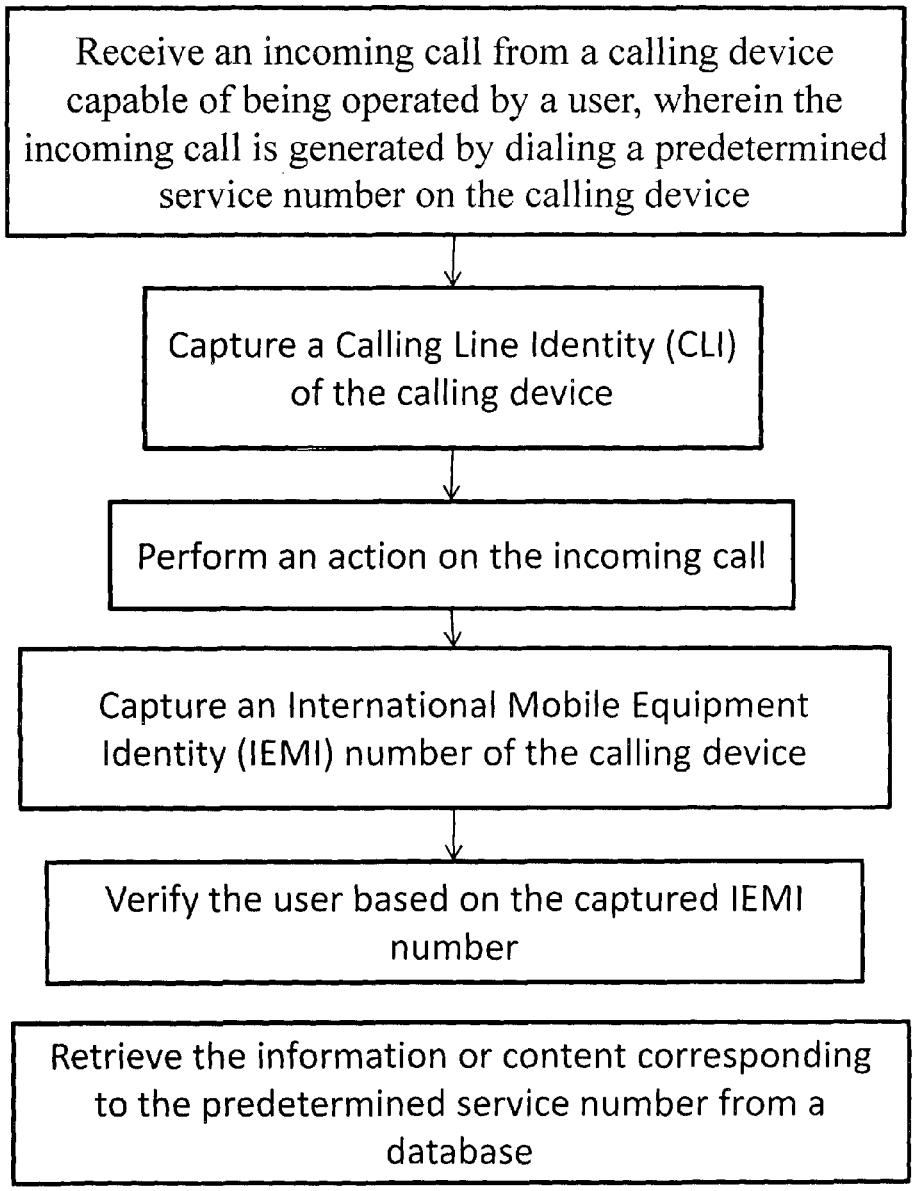
Figure 10:
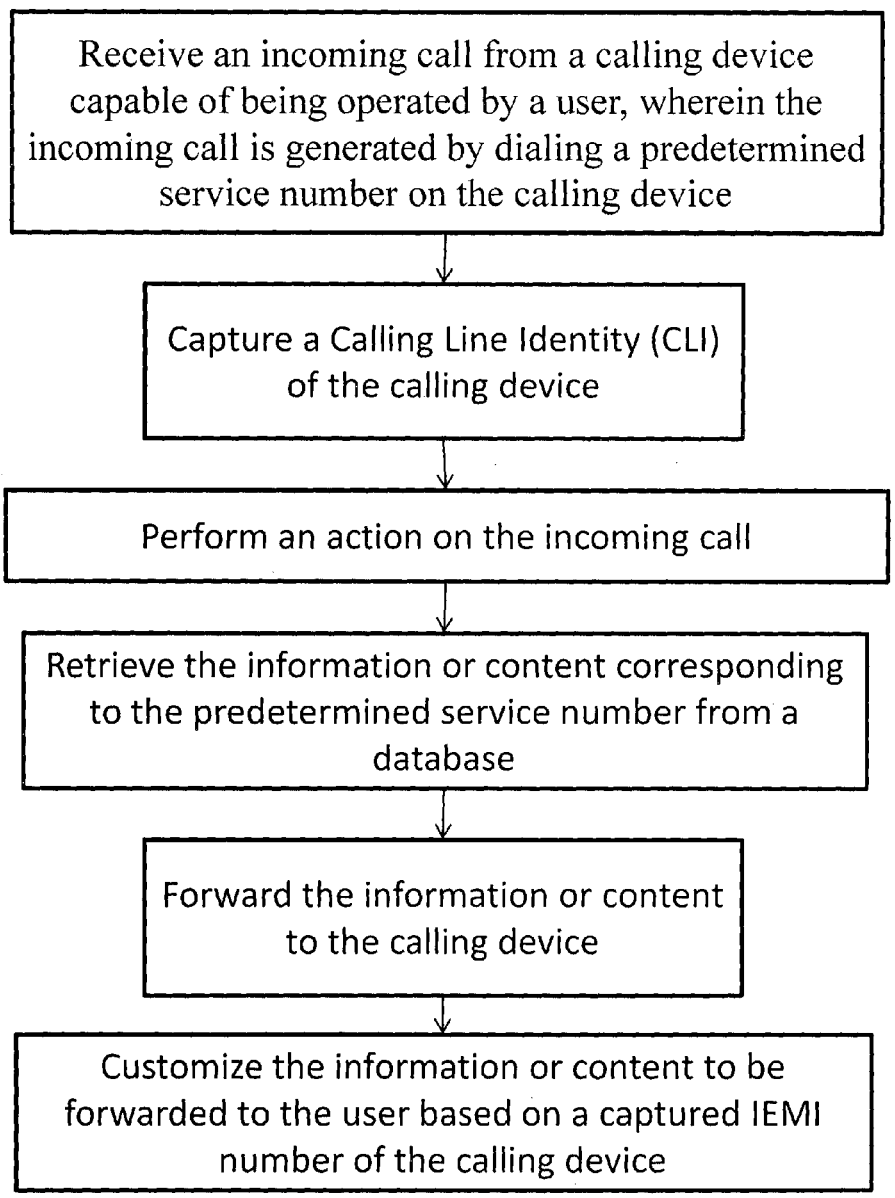

In another embodiment, the system 1000 includes a security module 350, shown in FIG. 6. The security module 350 plays a very important role in the system 1000. The security module 350 tracks a CLI (Calling Line Identity) and a unique International Mobile Equipment Identity (IMEI) of the calling device 2000 by which the user is making the incoming call to the system 1000. The tracked CLI and the unique IMEI number of the calling device 2000 is further forwarded by the security module 350 to the call forwarding module 500. In one embodiment, the security module 350 also confirms whether the unique IMEI number of the calling device 2000 is genuine or not, if the unique IMEI number of the calling device 2000 is genuine the system 1000 follows the next step by sending the information to the call forwarding module 500, if the unique IMEI number of the calling device 2000 is not genuine the system 1000 stops the process and sends a rejection confirmation to the calling device 2000. The invention envisages special utility of this feature in providing information or content or performing tasks in banking industry.

Yet in another embodiment, the system 1000 customize the content which is based on the IMEI number identification, for example the user call from the calling device 2000 the security module 350 tracks the unique IMEI number of the user calling device 2000. Through the unique IMEI number of the user calling device 2000 the system 1000 identifies the handset model number of the user calling device 2000. Further, the content or the services which is provided by the system 1000 to user calling device 2000 is made compatible for the handset model number of the user calling device 2000.

Further the system 1000 also customize the content or services based on the telecom operator used by the user calling device 2000, for example the user wants the content or services delivered to him by the system 1000 in Hindi, the system 1000 customize the content as per user requirement which is based on the unique IMEI number of the user calling device 2000 and delivers the content or services to the user in Hindi. More specifically, the system 1000 includes a customization module communicably coupled to the forwarding module 500, wherein the customization module is configured to customize information or content to be forwarded to the calling device 2000 based on the captured IEMI number.

In use, the system 1000 works as follows. For performing one or more desired tasks or provisioning of content or information, users may be provided with various master number sequences. The user on being provided with the master number sequences may send an incoming call to the system 1000 when they desire by dialing the master number sequence from their calling device 2000, such as mobile phones. The user may also send the initiation call in form of a text message.

The incoming call request may land on the system 1000 and may be received by the call landing module 100. The call landing module 100 may forward the initiation request to the call action module 200.

In one embodiment, the call action module 200 may either reject the incoming call request, thereby terminating the incoming call request. Alternatively, the call action module 200 may accept the call and terminate the incoming call request immediately. The call action module 200 may also reject the incoming call request and send the incoming call request to the call back module 150, which may call back the user and terminate the incoming call request.

After at least one of the aforementioned functions is performed at the call action module 200, the call processing module 300 identifies the caller IDs and the master number sequences from the incoming call requests. Thereafter, the call processing module 300 identifies the one or more services or information or content or tasks that are associated with the identified master number sequences. The call processing module 300 may use the caller IDs and stored profiles in the profile database 250 for determining the one or more services that are required to be provided.

After identification of the one or more services, the master module 500 may provide the one or more services or content or information or may perform the task. For example, on determining that the request made by the calling devices 2000 are for delivery of the content, the master module 500 may provide the content information to the calling devices 2000 via the application interface 410. Similarly, on determining that the request made by the calling device 2000 is for providing reservations, the master module 500 may provide the reservation via the application interface 410. The master module may also send the content to third party clients 700 if needed. The security module allows the system 1000 to be secured and prevents unauthorized access of the services provided by the system 1000. The customization module assists in customizing information or content to be forwarded to the calling device based on a captured IEMI number of the calling device.

Figure 4:
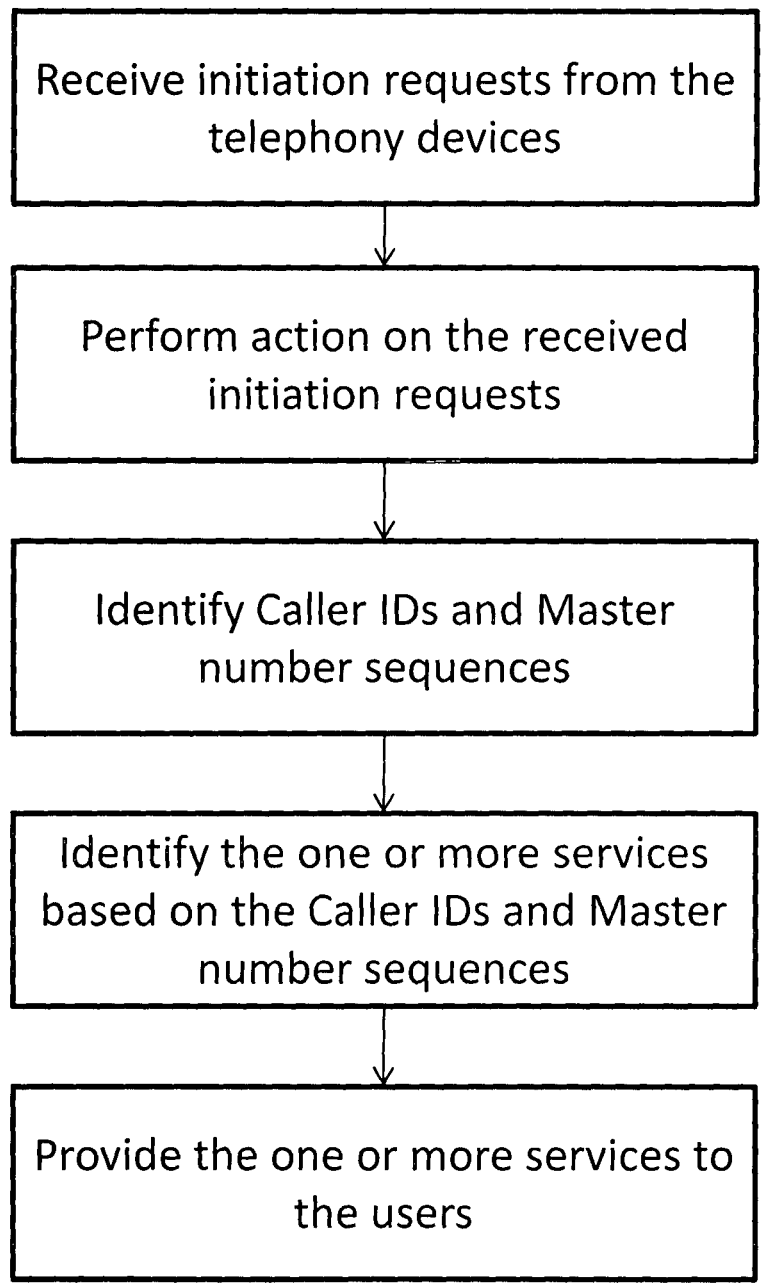
FIG. 4, 7-10 illustrates block diagrams of the method for providing services in a communication network, according to various embodiments of the present disclosure.

In another aspect, the present invention provides a method for providing information or services or content or performing task in a communication network. The method will be explained with reference to FIGS. 4, 7-10. As shown in FIG. 4, the method 3000 starts at step 2010, wherein an incoming call is received from the calling device. Thereafter, the method 3000 includes performing an action on the received incoming, at step 2020. The performing action may include rejecting the incoming call request (incoming call request), or accepting the incoming call request and immediately disconnecting the incoming call request, or rejecting the incoming call request, arranging a call back to the user, and disconnecting the incoming call when accepted by the user. After performing an action on the received initiation requests, the method 3000 includes identifying the caller ID information and the master number sequence from the initiation request, at step 2030. After identifying the caller ID information and the master number sequence, the method 3000 includes identifying the one or more services that are required to be performed based on the identified caller ID and master number sequence, at step 2040. Finally, the method 3000 includes performing the one or more services identified at step 2040, at step 2050.

As per the embodiment of the present invention the system will provide the different—different master numbers for end users for their services. It means one master number allotted to one user for service 1, it doesn't mean that the same master number will be used for other end user for same service, it can be allotted to any other user for any other service whatever the user has subscribed. It will help the user for miss use of any service by any other phone in case of accessibility to other user phone.

As per the embodiment of the present invention the system will provide the facility of blocking and unblocking of the various documents, security, confidential and financial credentials. The end user can register their necessary information, security and financial documents to the system and can block and unblock them over a click of mouse, missed/rejected call, SMS, MMS, USSD, Mobile App and any other possible communication devices. These credentials can be credit card, traveller cheque, banker cheque, passbook, driving license, passport, PAN card and any other document that can be register with the system. In case of lost of any document the end user can block the uses of that document and in case of found unblock/enable by communication to the system via click of mouse, missed/rejected call, SMS, MMS, USSD, Mobile App and any other possible communication devices.

In use, the system 1000 may be adapted to perform one or more of the following applications. It should be understood that the applications listed are only exemplary and should not be construed as a limitation to the present invention.

1. Gas Booking Application—

In this application, a user who has to book his gas cylinder may send the incoming call request by dialing one or more predetermined master number sequences from their calling device. The calling device may be registered or unregistered. In one embodiment, the calling device may be a preregistered calling device with the system 1000. More specifically, the user may have a profile corresponding to the calling device in a profile database. On receipt of the incoming call request, the system 1000 may perform an action on the incoming call request. In one embodiment, the system 1000 may reject the incoming call request. In another embodiment, the system 1000 may accept the incoming call request and then reject the incoming call request. In another embodiment, the system 1000 may reject the incoming call request, call back the user, and then reject the call back. After performing one of the aforementioned actions, the system 1000 may identify the caller ID information and the master number sequence.

Thereafter, the system 1000 may identify the one or more services or content or information or tasks that are required to be performed corresponding to the one or more master number sequence. In an embodiment, the system 1000 may identify the one or more services that are required to be performed based on the master number sequence and the profile of the user. In this case, the system 1000 identifies that the user intends to book the gas cylinder.

After the identification of the one or more services, the system 1000 may perform those one or more desired services. In this case, the system 1000 may initiate for providing the gas cylinders to the users. The system 1000 may generate a unique complaint code, and send the code to the user along with a confirmation message. Further, the system 1000 may forward the listing of the one or more services to the third party clients, which in this case are the gas service operators. The system 1000 may update the logs and track the status of the delivery of gas cylinders till it is delivered.

2. Railway Reservation Management Application—

In this application, a user who has to either book or check status of his reserved tickets may send an incoming request by dialing one or more predetermined master number sequences from their calling device. It should be understood that the calling device may be a registered or unregistered calling device. More specifically, the user may have a registered profile corresponding to the calling device in a profile database.

On receipt of the incoming call request, the system 1000 may perform an action on the incoming call request. In one embodiment, the system 1000 may reject the incoming call request. In another embodiment, the system 1000 may accept the incoming call request and then reject the incoming call request. In another embodiment, the system 1000 may reject the incoming call request, call back the user, and then reject the call back. After performing one of the aforementioned actions, the system 1000 may identify the caller ID information and the master number sequence. Thereafter, the system 1000 may identify the one or more desired services that are required to be performed corresponding to the one or more master number sequences. In an embodiment, the system 1000 may identify the one or more desired services that are required to be performed based on the master number sequence and the profile of the user. In this case, the system 1000 identifies that the user intends to book railway tickets, or know the status of their booked tickets.

After the identification of the one or more task, the system 1000 may perform those one or more desired services. In one embodiment, if the user has dialed a single master number sequence, the system 1000 may provide reservation status of his/her booking. In another embodiment, if the user has dialed a single master number sequence, the system 1000 may provide the train running status corresponding to his booking. In another embodiment, if the user has dialed two master number sequences, the system 1000 may identify the corresponding station codes to the two master number sequences, and may provide train running status between the two identified stations. In another embodiment, if a single master number sequence is dialed by the user, the system 1000 may identify that the master number sequence is corresponding to cancellation of tickets reserved by the user, and may accordingly provide for cancellation of the tickets of the user.

3. Banking Management Application—

This application will be used in banking management. In this application, a user who has to either check status of his bank accounts or do banking transactions, such as booking Fixed Deposits, Transfer Funds, or know information about various banking schemes, may send an incoming request by dialing one or more predetermined master number sequences from their calling device. It should be understood that the calling device may be a registered or unregistered calling device. More specifically, the user may have a registered profile corresponding to the calling device in a profile database.

On receipt of the incoming call request, the system 1000 may perform an action on the incoming call request. In one embodiment, the system 1000 may reject the incoming call request. In another embodiment, the system 1000 may accept the incoming call request and then reject the incoming call request. In another embodiment, the system 1000 may reject the incoming call request, call back the user, and then reject the call back. After performing one of the aforementioned actions, the system 1000 may identify the caller ID information and the master number sequence. Thereafter, the system 1000 may identify the one or more desired information or content or services, or task that are required to be sent/performed corresponding to the one or more master number sequences. In an embodiment, the system 1000 may identify the one or more desired services that are required to be performed based on the master number sequence and the profile of the user. Additionally, the system 1000 may identify the IEMI number of the calling device and verify the authenticity of the user. In this case, the system 1000 identifies that the user intends to book a FD, or know the status of their bank accounts, and the link.

After the identification of the one or more task, the system 1000 may perform those one or more desired services or provide the information or perform the task. In one embodiment, if the user has dialed a single master number sequence, the system 1000 may provide bank status of his/her booking. In another embodiment, if the user has dialed a single master number sequence, the system 1000 may provide the latest banking schemes. In another embodiment, if the user has dialed two master number sequences, the system 1000 may identify the corresponding bank accounts and perform a monetary fund transfer. It will be apparent to a person skilled in the art that the aforementioned examples of the banking operations are only exemplary and should not be construed as a limitation to the present invention.

4. Credit Card Blocking—

In this application, a user who is holding a credit card account can block his credit card account when he loses his credit card by just dialing a master number. In this case, the user may send an incoming request by dialing one or more predetermined master number sequences from their calling device. It should be understood that the calling device may be a registered or unregistered calling device. More specifically, the user may have a registered profile corresponding to the calling device in a profile database.

On receipt of the incoming call request, the system 1000 may perform an action on the incoming call request. In one embodiment, the system 1000 may reject the incoming call request. In another embodiment, the system 1000 may accept the incoming call request and then reject the incoming call request. In another embodiment, the system 1000 may reject the incoming call request, call back the user, and then reject the call back. After performing one of the aforementioned actions, the system 1000 may identify the caller ID information and the master number sequence. Thereafter, the system 1000 may identify the credit card account from the pre-stored profile of the user and may send this information to the corresponding bank server, which may perform the blocking of the credit card account. The user may in return get a SMS confirming the blocking.

5. Lead Generation—

In this application, companies may be able to use the system 1000 for generating various customer leads and may use it for brand promotion. A user who is interested in any promotional scheme or has to either book any property or is interested in receiving free coupons may send an incoming request by dialing one or more predetermined master number sequences from their calling device. It should be understood that the calling device may be a registered or unregistered calling device. More specifically, the user may have a registered profile corresponding to the calling device in a profile database.

On receipt of the incoming call request, the system 1000 may perform an action on the incoming call request. In one embodiment, the system 1000 may reject the incoming call request. In another embodiment, the system 1000 may accept the incoming call request and then reject the incoming call request. In another embodiment, the system 1000 may reject the incoming call request, call back the user, and then reject the call back. After performing one of the aforementioned actions, the system 1000 may identify the caller ID information and the master number sequence. Thereafter, the system 1000 may identify the one or more desired information or content that is required to be sent corresponding to the one or more master number sequences. In an embodiment, the system 1000 may forward the information about the calling device to the company whose promotional scheme is being managed.

In this case, the system 1000 identifies that the user intends to seek information about the promotional scheme. After the identification of the same, the system 1000 may perform those one or more desired services. In one embodiment, if the user has dialed a single master number sequence, the system 1000 may provide the scheme details to the user. In another embodiment, if the user has dialed a single master number sequence, the system 1000 may provide the scheme details and send this information to both the user and the customer care executive of the company. The executive can then follow up on the scheme with the user.

Intelligent Query Distribution—

In one embodiment, the leads captured by the system 1000 may be intelligently forwarded to the various customer care executive. In this embodiment, the system 1000 after capturing the CLI is in a position to determine the service operator of the calling device. The system 1000 therefore sends the caller lead to those executives that use the same service operator as compared to the calling user. In this manner, only those executives are able to return calls to the calling device that use the services of same operator. This saves the money since calling rates between same service operators is cheaper than calling rates between different service operators.

6. Change Password—

In this application, a user may be able to change his/her passwords by just dialing a master number and giving a miss call. In this case, the user may send an incoming request by dialing one or more predetermined master number sequences from their calling device. It should be understood that the calling device may be a registered or unregistered calling device. More specifically, the user may have a registered profile corresponding to the calling device in a profile database. On receipt of the incoming call request, the system 1000 may perform an action on the incoming call request. In one embodiment, the system 1000 may reject the incoming call request. In another embodiment, the system 1000 may accept the incoming call request and then reject the incoming call request. In another embodiment, the system 1000 may reject the incoming call request, call back the user, and then reject the call back. After performing one of the aforementioned actions, the system 1000 may identify the caller ID information and the master number sequence. Thereafter, the system 1000 may identify the desired account for which the password is required to be changed. For example, from the CLI and the dialed master number sequence, the system 1000 is able to determine that this particular user, say X, intends to change password of his particular bank account, say Y12YYYYY3. The system 1000 accordingly sends the information to the bank server, which changes the password to a default password or to a desired password received from the user.

7. Mobile/DTH/Services Recharging & Bill Pay—

In this application, a user may be able to charge his/her mobile phone by just dialing a master number and giving a miss call. In this case, the user may send an incoming request by dialing one or more predetermined master number sequences from their calling device. It should be understood that the calling device may be a registered or unregistered calling device. More specifically, the user may have a registered profile corresponding to the calling device in a profile database.

On receipt of the incoming call request, the system 1000 may perform an action on the incoming call request. In one embodiment, the system 1000 may reject the incoming call request. In another embodiment, the system 1000 may accept the incoming call request and then reject the incoming call request. In another embodiment, the system 1000 may reject the incoming call request, call back the user, and then reject the call back. After performing one of the aforementioned actions, the system 1000 may identify the caller ID information and the master number sequence. Thereafter, the system 1000 may identify the service operator of the calling device 2000. For example, from the CLI and the dialed master number sequence, the system 1000 is able to determine that this particular user, say X, intends to charge the SIM card of the mobile phone. The system 1000 accordingly sends the information to the service operator server or to third party payment gateways, which monetarily charges the mobile phone by a fixed amount, and amount pre-stored by the user or by an amount provided by the user. It will be understood that in this case, the credit card, or online banking account of the user may be debited by the service operator or by the third party gateway. In the same manner, the services, such as DTH, electrical bills, credit card bill, and the like may be paid.

As per the embodiment of the present invention the system will provide the facility of buying travel tickets, air tickets, movie tickets, event passes, mobile recharge, DTH recharge, prepaid voucher, donation and many more services that can be done via a credit card or debit card.

8. Shopping Call—

In this application, a user may be able to purchase merchandize/goods/services by just dialing a master number and giving a miss call. In this case, the user may send an incoming request by dialing one or more predetermined master number sequences from their calling device. It should be understood that the calling device may be a registered or unregistered calling device. More specifically, the user may have a registered profile corresponding to the calling device in a profile database.

On receipt of the incoming call request, the system 1000 may perform an action on the incoming call request. In one embodiment, the system 1000 may reject the incoming call request. In another embodiment, the system 1000 may accept the incoming call request and then reject the incoming call request. In another embodiment, the system 1000 may reject the incoming call request, call back the user, and then reject the call back. After performing one of the aforementioned actions, the system 1000 may identify the caller ID information and the master number sequence. Thereafter, the system 1000 may identify the calling device 2000 and the services/goods/merchandize, the user needs to purchase. For example, from the CLI and the dialed master number sequence, the system 1000 is able to determine that this particular user, say X, intends to purchase movie tickets of a particular movie, by evaluating the master number sequence. The system 1000 accordingly sends the information to the third party payment gateways, which monetarily charges the mobile phone by a fixed amount, and amount pre-stored by the user or by an amount provided by the user. It will be understood that in this case, the credit card, or online banking account of the user may be debited by the service operator or by the third party gateway.

9. Government Documentation—

In this application, a user may be able to get the government documentation done by just dialing a master number and giving a miss call. In this case, the user may send an incoming request by dialing one or more predetermined master number sequences from their calling device. It should be understood that the calling device may be a registered or unregistered calling device. More specifically, the user may have a registered profile corresponding to the calling device in a profile database.

On receipt of the incoming call request, the system 1000 may perform an action on the incoming call request. In one embodiment, the system 1000 may reject the incoming call request. In another embodiment, the system 1000 may accept the incoming call request and then reject the incoming call request. In another embodiment, the system 1000 may reject the incoming call request, call back the user, and then reject the call back. After performing one of the aforementioned actions, the system 1000 may identify the caller ID information and the master number sequence. Thereafter, the system 1000 may identify the calling device 2000, from the details of the calling device 2000, the system 1000 is able to identify the documentation already possessed by the user, his identity, genuineness and the like. For example, from the CLI and the dialed master number sequence, the system 1000 is able to determine that this particular user, say X, intends to apply for a PAN CARD and he/she already possesses a passport, ration card and driving license. The system 1000 accordingly sends the information to the third party government servers, which acknowledge the receipt of the application and the details forwarded, and processes the application.

10. Complaint Generation—

In this application, companies may be able to use the system 1000 for register customer complaints. A user who is interested in registering a complaint may send an incoming call request by dialing one or more predetermined master number sequences from their calling device. It should be understood that the calling device may be a registered or unregistered calling device. More specifically, the user may have a registered profile corresponding to the calling device in a profile database.

On receipt of the incoming call request, the system 1000 may perform an action on the incoming call request. In one embodiment, the system 1000 may reject the incoming call request. In another embodiment, the system 1000 may accept the incoming call request and then reject the incoming call request. In another embodiment, the system 1000 may reject the incoming call request, call back the user, and then reject the call back. After performing one of the aforementioned actions, the system 1000 may identify the caller ID information and the master number sequence. Thereafter, the system 1000 may log the user complaint against his/her mobile number and also through his/her details already stored in the database. In one embodiment, the system 1000 may forward the information to a customer care executive of the company. The executive can then follow up on the complaint with the user.

Intelligent Query Distribution—

In one embodiment, the complaints captured by the system 1000 may be intelligently forwarded to the various customer care executives. In this embodiment, the system 1000 after capturing the CLI is in a position to determine the service operator of the calling device. The system 1000 therefore sends the caller lead to those executives that use the same service operator as compared to the calling user. In this manner, only those executives are able to return calls to the calling device that use the services of same operator. This saves the money since calling rates between same service operators is cheaper than calling rates between different service operators. Additionally, the system 1000 may be able to track the number of times the user is registering the complaint and in this manner determine whether his/her complaint is getting resolved. In case, the complaint is not getting resolved, the system 1000 may intelligently send the complaint details to higher authorities for follow up.

11. Activation/Deactivation of Govt. Documents/License—

In case of activation of deactivation of PAN Card the authorized person will give a call to the service number (master number). The service platform running for this system will capture the CLI of the requester and reject the call. After rejecting the call the system will check for the details the request arrived for activating or deactivating the PAN Card, as per the request type like activation or deactivation the system will attach the PAN number along with activation/deactivation Parameter and hit to PAN provider system (e.g. NSDL). The system running at third party (NSDL) end will capture the PAN number and Parameter for activation or deactivation and put it into queue for process, in couple of seconds the system will process the request and provide status as success or failure. As per the status from third party end the system will provide the response to the requester for successful activation or deactivation with Success for failure message for the Registered PAN Card.

In case of activation of deactivation of Driving License the authorized person will give a call to the service number (master number). The service platform running for this system will capture the CLI of the requester and reject the call. After rejecting the call the system will check for the details the request arrived for activating or deactivating the Driving License, as per the request type like activation or deactivation the system will attach the Driving License number along with activation/deactivation Parameter and hit to Driving License provider system (eg RTO Centralized System). The system running at third party (RTO Centralized System) end will capture the Driving License number and Parameter for activation or deactivation and put it into queue for process, in couple of seconds the system will process the request and provide status as success or failure. As per the status from third party end the system will provide the response to the requester for successful activation or deactivation with Success for failure message for the registered Driving License.

12. Multiple Level Marketing, Payout Request, Product Request, Balance Information, Binary Left/Right Information on Missed Call—

In this application, a user may be able to manage multi level marketing by just dialing a master number and giving a miss call.

13. Lucky Miss Call—

In this application, a user may be able to play lottery games by just dialing a master number and giving a miss call. In this case, the user may send an incoming request by dialing one or more predetermined master number sequences from their calling device. It should be understood that the calling device may be a registered or unregistered calling device. More specifically, the user may have a registered profile corresponding to the calling device in a profile database. On receipt of the incoming call request, the system 1000 may perform an action on the incoming call request. In one embodiment, the system 1000 may reject the incoming call request. In another embodiment, the system 1000 may accept the incoming call request and then reject the incoming call request. In another embodiment, the system 1000 may reject the incoming call request, call back the user, and then reject the call back. After performing one of the aforementioned actions, the system 1000 may identify the caller ID information and the master number sequence. Thereafter, the system 1000 may identify the calling device 2000 and the profile of the user. Thereafter, the system 1000 may generate a transaction ID at its end and sends the transaction ID to the calling device 2000. If the transaction ID is similar to the mobile number of the user, the system 1000 identifies such resemblance and generates a winning message for the user. The user may be monetarily remunerated on his being a winner.

The advantages of the system 1000 as described above are many. The important advantages are enticed herein. Firstly, the system provides an easy, affordable and reliable means for providing various services in a communication network. Secondly, the system 1000 incurs minimum or almost zero financial tolls on the customers by tracking their telecom operators details and call back to the user by the system 1000 from same telecom operator. Thirdly, the system 1000 provides a means for providing services in a communication network, which provide considerable revenues to the service operators, and thereby takes their concerns into consideration. Fourthly, the system 1000 is adapted to provide modern day interactive services, content and value added services to the customers. Fifthly, the system 1000 provides security to the user. Sixthly, system 1000 checks whether the user is using genuine telephone devices 2000 or not.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

I claim:

1. A system for providing content or information over a communication network having one or more service providers; the system comprising:
   a call handler comprising,
      a call landing module configured to receive an incoming call from a calling device capable of being operated by a User, wherein the incoming call is generated by dialing a predetermined service number from the calling device,
      a call action module configured to capture Calling Line Identity (CLI) of said calling device and capture said predetermined service number, wherein said call action module accepts incoming call and then automatically rejects said incoming call after acceptance of the incoming call to enable at least one of said service provider to derive monetary benefit while providing said content or information over the communication network;
      a look up module configured to scan a database having a list of service numbers to extract said content or information corresponding to said predetermined service number from said database; and
      a forwarding module configured to forward said content or information to said calling device.

2. The system as claimed in claim 1, wherein the predetermined service number is one or a combination of a numeric number and an alphanumeric number.

3. The system as claimed in claim 1, wherein said rejection of incoming call happens after a pre-defined time of acceptance of the incoming call.

4. The system as claimed in claim 3, wherein said call back enables said system to respond to purpose of said incoming call at said predetermined service number.

5. The system as claimed in claim 1, wherein said system is further configured to call back the calling device after said incoming call is rejected.

6. The system as claimed in claim 1, wherein said look up module is configured to retrieve said information or content based on profile of caller of said incoming call.

7. The system as claimed in claim 1, wherein said content or information comprises one or a combination of train arrival information, booking status, voting confirmation, stock exchange information, trading details, PAN card status, passport status, bank account information, bank transactions and statements details, cooking gas booking, gas connection status, electric bill details, telephone bill details, electric connection status, house tax details, income tax details, provident fund and TDS details, water bill details, student details, school details, educational results status, employee details, stock details, company details, quiz draw status, lottery draw status, delivery status, all types of bills and network marketing and multi-level marketing details and information non-government organizations details, political parties details, celebrity messages and details, any membership details, customers details, commitment details, subscribers details and facility of getting rates details by their own desire at desired time of various products like Market Rate Information, Fruit rate, Vegetable Rate, Grains Rate, Seeds Rate, Goods Rate, Vehicle Rate, Spare Parts Rate, Food Items, Gold rate; Silver rate, Metal Rate, Copper Rate, Powder, Liquid and Solid Products Rates, Travel rates, shares and stock rates, hotel rates, education fees, consultation fee, government and private fees and the like.

8. The system as claimed in claim 1, wherein said system further comprises a safety Module configured to capture IMEI of said calling device and authenticate said calling device based on said captured IMEI.

9. The system as claimed in claim 8 comprising a customization module configured to customize information or content to be forwarded to said calling device based on said captured IEMI number.

10. The system as claimed in claim 1, wherein said forwarding module forwards said information or content to said calling device through one or a combination of a short text messaging service, and a voice call service based on service operator information of the calling device.

11. The system as claimed in claim 1 further comprising an operator identification module which is configured to track the details of the telecom operator of the said calling device, and forward the details of the telecom operator to the forwarding module.

12. The s stem as claimed in claim 11, wherein the call forwarding module forwards said content or information to said calling device using the same operator as that of the calling device.

13. A method for providing content or information over a communication network having one or more service providers, said method comprising the steps of:
   receiving an incoming call from a calling device capable of being operated by a user, wherein the incoming call is generated by dialing a predetermined service number from the calling device,
   capturing Calling Line Identity (CLI) of said calling device and capturing said predetermined service number,
   accepting said incoming call to establish call connection and then automatically rejecting said incoming call after accepting the incoming call to enable at least one of said service provider to derive monetary benefit while providing said content or information over the communication network;
   scanning a database having a list of service numbers to extract said Content or information corresponding to said predetermined service number from said database; and
   forwarding said content or information to said calling device.

14. The method as claimed in claim 13, wherein the predetermined service number is one or a combination of a numeric number and an alphanumeric number.

15. The method as claimed in claim 13, wherein said rejection of incoming call happens automatically after a pre-defined time.

16. The method as claimed in claim 13, wherein said method further comprises the step of calling back the calling device after said incoming call is rejection.

17. The method as claimed in claim 16, wherein said call back enables said method to respond to the purpose of said incoming call at said predetermined service number.

18. The method as claimed in claim 13, wherein said method further comprises the step of capturing IMEI of said calling device and authenticating said calling device based on said captured IMEI.

19. The method as claimed in claim 18 further comprising the step of customizing information or content to be forwarded to said calling device based on said captured IEMI number.

20. A system for providing content or information over a communication network having one or more service providers, the system comprising:
   a call handler comprising,
      a call landing module configured to receive an incoming call from a calling device capable of being operated by a user, wherein the incoming call is generated by dialing a predetermined service number from the calling device, a call action module configured to capture Calling Line identity (CLI) of said caning device and capture said predetermined service number, wherein said call action module automatically rejects said incoming call;

a look up module configured to scan a database having a list of service numbers to extract said content or information corresponding to said predetermined service number from said database; and a forwarding module Configured to forward said content Or information to said calling device, wherein the system further comprises an operator identification module which is configured to track the details of the telecom operator of the said calling device, and forward the details of the telecom operator to the forwarding module, and wherein the call forwarding module forwards said content or information to said calling device using the same operator as that of the calling device.

* * * * *